US012529787B2

United States Patent
Torres et al.

(10) Patent No.: US 12,529,787 B2
(45) Date of Patent: Jan. 20, 2026

(54) METHOD FOR RADAR INTERFERENCE MITIGATION

(71) Applicant: Aptiv Technologies AG, Schaffhausen (CH)

(72) Inventors: Felipe Torres, Hilden (DE); Michael Esper, Sonsbeck (DE)

(73) Assignee: Aptiv Technologies AG, Schaffhausen (CH)

( * ) Notice: Subject to any disclaimer, the term of this patent is extended or adjusted under 35 U.S.C. 154(b) by 248 days.

(21) Appl. No.: 17/658,384

(22) Filed: Apr. 7, 2022

(65) Prior Publication Data

US 2022/0326374 A1 Oct. 13, 2022

(30) Foreign Application Priority Data

Apr. 9, 2021 (EP) .................................... 21167710
Mar. 31, 2022 (EP) .................................... 22165934

(51) Int. Cl.
*G01S 13/931* (2020.01)
*G01S 7/02* (2006.01)

(52) U.S. Cl.
CPC ............ *G01S 13/931* (2013.01); *G01S 7/023* (2013.01); *G01S 2013/9316* (2020.01)

(58) Field of Classification Search
CPC .... G01S 13/931; G01S 13/933; G01S 13/937; G01S 15/931; H04W 4/024
See application file for complete search history.

(56) References Cited

U.S. PATENT DOCUMENTS

| 8,965,677 B2* | 2/2015 | Breed ................... B60W 30/04 |
| | | 701/301 |
| 11,940,526 B2* | 3/2024 | Chae ....................... G01S 13/46 |

(Continued)

FOREIGN PATENT DOCUMENTS

| CN | 107110969 A | 8/2017 |
| CN | 110794398 A | 2/2020 |

(Continued)

OTHER PUBLICATIONS

Cupek et al.,"Application of OPC UA Protocol for the Internet of Vehicles", Sep. 2017, International Conference on Computational Collective Intelligence, ICCCI 2017: Computational Collective Intelligence, pp. 272-2811 (Year: 2017).*

(Continued)

*Primary Examiner* — Vladimir Magloire
*Assistant Examiner* — Eric K Hodac
(74) *Attorney, Agent, or Firm* — Harness, Dickey & Pierce, P.L.C.

(57) ABSTRACT

This document discloses techniques, apparatuses, and systems for mitigating radar interference between radar sensor devices (e.g., on multiple vehicles), including various performed by a first radar sensor device (e.g., within a first vehicle). The first radar sensor device determines information about a driving scenario in a surrounding environment of the first radar sensor device based on information received from multiple sources. The first radar sensor may determine, based on the determined information about the driving scenario in the surrounding environment, how to change at least one radar parameter of the first radar sensor device to avoid a possible radar interference. The at least one radar parameter may be changed according to the determination. In this way, a radar sensor device may mitigate radar interferences and improve radar performance.

15 Claims, 3 Drawing Sheets

(56) References Cited

U.S. PATENT DOCUMENTS

| | | | |
|---|---|---|---|
| 2007/0164896 A1 | 7/2007 | Suzuki et al. | |
| 2008/0106458 A1 | 5/2008 | Honda et al. | |
| 2016/0061935 A1* | 3/2016 | McCloskey | G01S 13/08 342/82 |
| 2017/0123048 A1* | 5/2017 | Siemes | G08G 1/096758 |
| 2019/0383925 A1 | 12/2019 | Gulati et al. | |
| 2020/0036487 A1 | 1/2020 | Hammond et al. | |
| 2021/0063566 A1 | 3/2021 | Smith et al. | |
| 2022/0276336 A1* | 9/2022 | Zhang | G01S 7/021 |
| 2022/0326344 A1 | 10/2022 | Torres et al. | |

FOREIGN PATENT DOCUMENTS

| | | |
|---|---|---|
| DE | 102017216435 | 3/2019 |
| DE | 102019202836 | 9/2020 |
| DE | 102019202836 A1 * | 9/2020 |
| EP | 1785744 A1 | 5/2007 |
| EP | 3748879 | 12/2020 |
| EP | 3779499 | 2/2021 |
| WO | 2019013948 A1 | 1/2019 |
| WO | 2020027591 | 2/2020 |

OTHER PUBLICATIONS

Cupek et al.,"Application of OPC UA Protocol for the Internet of Vehicles", Sep. 2017, International Conference on Computational Collective Intelligence, ICCCI 2017: Computational Collective Intelligence, pp. 272-2811 (Year: 2017) (Year: 2017).*

"Extended European Search Report", EP Application No. 22165934.5, Jul. 28, 2022, 11 pages.

"Extended European Search Report", EP Application No. 21167710.9, Sep. 23, 2021, 9 pages.

"Extended European Search Report", EP Application No. 21167706.7, Sep. 28, 2021, 13 pages.

"Intelligent Transport Systems—Cooperative Adaptive Cruise Control Systems (CACC)—Performance Requirements and Test Proceduires", ISO 20035, Jan. 2019, 8 pages.

Aydogdu, et al., "RadChat: Spectrum Sharing for Automotive Radar Interference Mitigation", Aug. 22, 2019, 14 pages.

Cupek, et al., "Application of OPC UA Protocol for the Internet of Vehicles", Sep. 2017, pp. 272-2811.

Khoury, et al., "RadarMAC: Mitigating Radar Interference in Self-Driving Cars", Jun. 27, 2019, 9 pages.

Ulbrich, et al., "Defining and Substantiating the Terms Scene, Situation, and Scenario for Automated Driving", Nov. 2015, 7 pages.

First Office Action regarding Chinese Patent Application No. 202210359365.8, dated Jan. 25, 2025. Translation provided by Google Translate.

European Examination Report regarding European Patent Application No. 21167710.9 dated Jun. 12, 2024.

European Examination Report regarding European Patent Application No. 22165934.5, dated Jul. 2, 2024.

Examination Report regarding European Patent Application No. 22165934.5, dated Oct. 6, 2025.

* cited by examiner

METHOD FOR RADAR INTERFERENCE MITIGATION

CROSS-REFERENCE TO RELATED APPLICATION(S)

This application claims priority to European Patent Application Number 22165934.5, filed Mar. 31, 2022, and European Patent Application Number 21167710.9, filed Apr. 9, 2021, the disclosures of which are hereby incorporated by reference in their entireties herein.

BACKGROUND

A radar, or radar sensor, is a detection device that uses radio waves to determine information about objects such as the range, angle, shape, size and/or velocity of the objects.

A radar has a transmitter producing electromagnetic waves (in other words: an electromagnetic signal) in the radio or microwaves domain, a transmitting antenna, a receiving antenna (the same antenna may be used for transmitting and receiving), a receiver and a processor to determine properties of the object(s). The radar signal (pulsed or continuous) from the transmitter reflects off the object and returns to the receiver, giving information about the object.

Radars are used in vehicles to support drivers in driving safely, for example for Adaptive Cruise Control. Moreover, radars are a key element for autonomous or self-driving vehicles. They serve to map the environment and detect vehicles, obstacles, pedestrians, bikes, etc., in order to navigate safely. The self-driving vehicles need to have a plurality of radars to cover all sides around the vehicle. Radars have the capability of working under various conditions such as day, night, rain, fog, snow, etc.

Radar signals have different characteristics. For example, the radar signals can be pulsed or continuous and use one of different modulation schemes such as FMCW (Frequency Modulated Continuous Waves), PMCW (Phase Modulated Continuous Waves), OFDM (Orthogonal Frequency-Division Multiplexing).

Today, in the automotive field, many automotive long-range radars are based on Frequency Modulated Continuous Wave (FMCW) and operate in the 76-77 GHz band or the 24 GHz band.

In the future, it is expected that the number of radars on the roads will substantially increase, in particular due to the increasing deployment of self-driving vehicles and the increase of the number of radars per vehicle. This will result in an increasing concern about radar interference. In other words, radar interference between vehicular radar sensors is anticipated to become a major challenge.

As the number of vehicular radars increase on the roads, it becomes more likely that more than two radars face each other and have same radar parameters resulting in saturating at least one radar, termed as victim radar, by the transmit signal of another radar, termed as interferer radar, and causing the victim radar to be temporarily blinded. The radar blindness is a major security issue impeding the deployment of self-driving vehicles.

In order to avoid or limit the radar interference phenomenon, different techniques for radar interference mitigation are known.

A first known technique is based on interference suppression or cancellation, for example by using physical layer techniques. Such an approach requires additional processing resources and is not efficient enough per se.

A second known technique consists in assigning randomly new radar parameters to interferer or victim radars, for example a time offset or a frequency offset, as a countermeasure to avoid or limit the radar interference. The second technique is not enough, because the random assignment scheme is likely to result in conflicting assignments as the number of radars per vehicle and the number of vehicles equipped with radars increase.

A third technique is disclosed in the article "RadarMAC: Mitigating Radar Interference in Self-Driving Cars", J. Khoury, R. Ramanathan, D. McCloskey, R. Smith and T. Campbell, 2016 13th Annual IEEE International Conference on Sensing, Communication, and Networking (SECON), London, 2016, pp. 1-9, that addresses the problem of assigning conflict-free radar parameters so as to mitigate radar interference. The system of RadarMAC includes a control center to which a fleet of cars are connected via an LTE (Long Term Evolution) link. The system operates in a continuous loop having four steps:
(1) each car sends a position message to the control center every $T_{pos}$ seconds;
(2) the control center collects the position information from all the cars in its purview and computes the radar parameters for each radar on each car;
(3) the control center pushes down each car's radar parameters with a timestamp through the LTE link;
(4) the cars activate the received radar parameters at the specified timestamp.

In the RadarMAC system, the control center unilaterally assigns radar parameters to each radar on each car. Such a technique lacks flexibility as the radar sensor devices are forced to change some radar parameters under control of the control center.

Therefore, there is a need for a more flexible method for automotive radar interference mitigation.

SUMMARY

The present disclosure concerns method for mitigating radar interference between radar sensor devices on different vehicles, including the following steps performed by a first radar sensor device on a first vehicle: determining information about a driving scenario in a surrounding environment of the vehicle based on information received from multiple sources, based on the determined information about the driving scenario, determining how to change at least one radar parameter of the first radar sensor device to avoid a possible radar interference, and changing said at least one radar parameter according to the determination.

Based on the information received from multiples sources, or systems, the radar sensor device of the vehicle can determine on its own the driving scenario that is happening in the surrounding environment of the vehicle and, based on the information about the driving scenario, change its own radar parameters, in a flexible, efficient and relevant manner, to avoid a possible radar interference.

The multiple sources of information may be of different types.

In an embodiment, receiving information from multiple sources may include receiving, from at least one second vehicle, a radar parameter information of a second radar sensor device on said second vehicle, through a vehicle-to-vehicle communication.

In an embodiment, receiving information from multiple sources may include receiving information from at least one device of a communication network through a vehicle-to-network communication.

In an embodiment, receiving information from multiple sources may include receiving a radar signal from a second radar sensor device on at least one second vehicle and determining a radar parameter information of the second radar sensor device by analyzing the received radar signal.

In an embodiment, receiving information from multiple sources may include receiving a list of radar sensor devices on vehicles located in an area from a broadcasting center.

In an embodiment, receiving information from multiple sources may include receiving one or more Decentralized Environmental Notification Messages, DENMs, including information related to one or more detected events.

Advantageously, determining how to change at least one radar parameter of the first radar sensor device to avoid a possible radar interference may include selecting a rule from a set of predefined cooperative rules for radar interference mitigation shared by a plurality of radar sensor devices depending on the information about the environment, and changing said at least one radar parameter according to the determination may include activating a new radar operating parameter according to the selected rule in the first radar sensor device.

The radar sensor device may mitigate radar interferences based on cooperative rules shared by a community of radar sensor devices. The radar sensor device first identifies the present driving scenario the vehicle has to deal with and, depending on the identified driving scenario, selects an appropriate cooperative rule to determine a new radar parameter to activate so as to mitigate a possible radar interference. The cooperation between radar sensor devices is based on the shared cooperative rules, followed by all the radar sensor devices, and allows to mitigate radar interferences in a cooperative manner, which is more efficient.

Changing at least one radar parameter may include changing at least one of the parameters of the group including a modulation bandwidth, a frequency offset, a time offset, a transmit power level, a duty cycle, a polarization, a modulation type.

The present disclosure also concerns a radar sensor device including a transmitter part to transmit radar wave signals, a receiver part to receive radar wave signals, a memory storing a set of predefined cooperative rules for radar interference mitigation, shared by a plurality of radar sensor devices, and means to execute the steps of the method previously defined.

The present disclosure also concerns a computer program including instructions to cause the radar sensor device above defined to execute the steps of the method previously defined.

The present disclosure also concerns a computer-readable medium having stored thereon the computer program.

The present disclosure also concerns a vehicle including at least one radar sensor device previously defined.

The present disclosure also concerns a system including a plurality of vehicles as above defined.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

Figure 1:
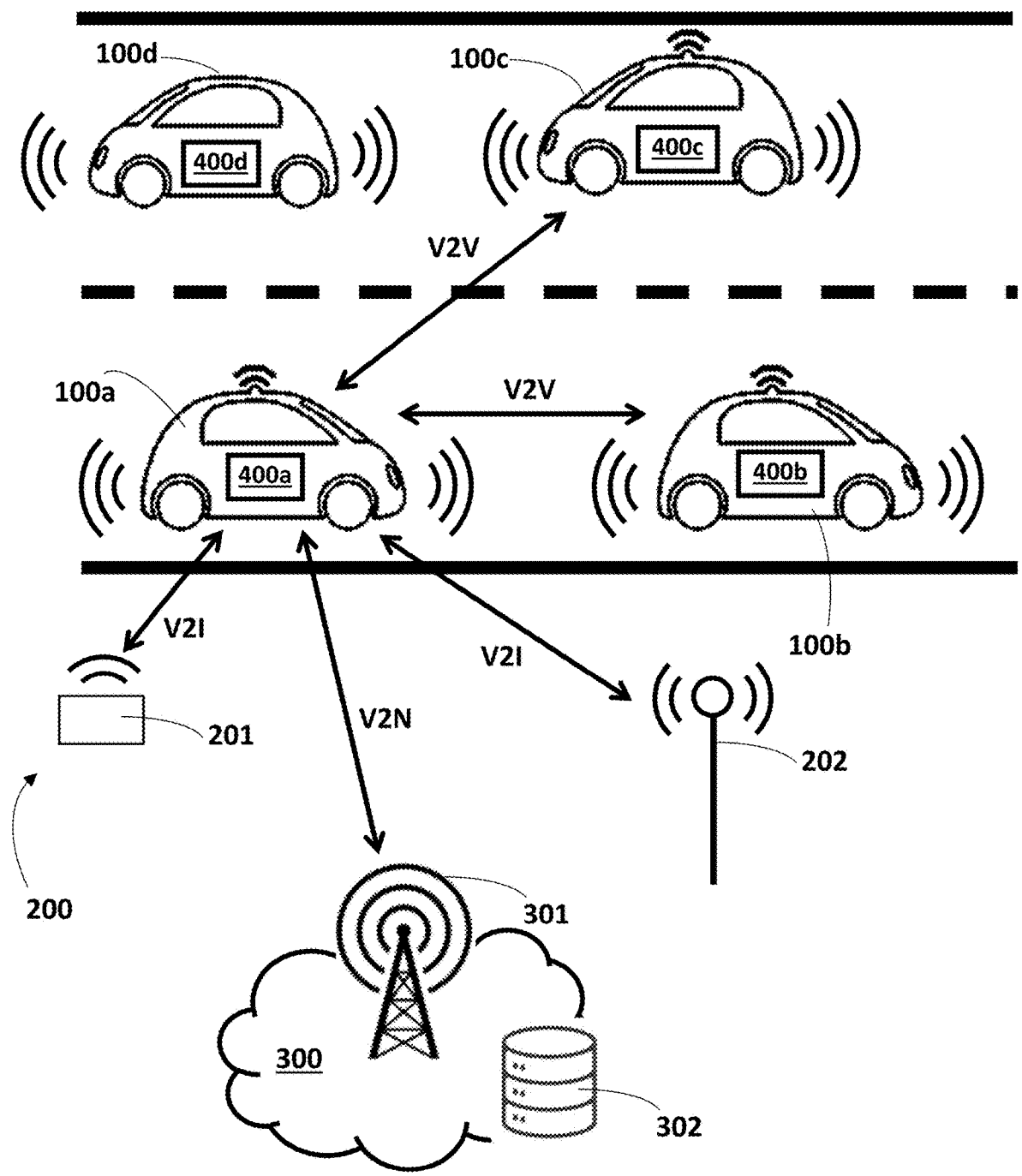
FIG. 1 shows a distributed system for mitigating radar interference between radar sensor devices on vehicles in an area, according to an embodiment.

FIG. 1 shows a distributed system for radar interference mitigation including a plurality of vehicles 100. Each vehicle 100 is equipped with one or more radar sensor devices 400.

In the illustrative and non-limitative example of the FIG. 1, four vehicles 100a, 100b, 100c and 100d are represented and, for clarity reason, only one radar sensor 400a, 400b, 400c, 400d is shown on each vehicle 100a, 100b, 100c, 100d. However, each vehicle could have more than one radar sensor device. In the example represented in FIG. 1, the four vehicles 100a-100d are close to each other, on a same road.

There are two kinds of radar sensor devices 400:— connected radar sensor devices with capability to communicate bidirectionally with other systems, or sources of information, outside of the vehicle 100 hosting the radar sensor device 400, such as another vehicle, a radar sensor device on another vehicle, a component of the road infrastructure and/or an element of a mobile communication network, —non-connected radar sensor devices without capability to communicate with other systems outside the vehicle 100.

In a first embodiment, the connected radar sensor device 400 communicates with systems, or sources, outside the vehicle 100 via a communication interface of an on-board network of the vehicle 100. In that case, the radar sensor device 400 has an internal communication interface to interface with the on-board network of the vehicle 100 and uses the communication interface of the connected vehicle 100 to communicate with other systems outside the vehicle 100. In a second embodiment, the connected radar sensor device can establish a direct wireless communication with the outside system. In that case, the connected radar sensor device 400 has an internal communication module to communicate wirelessly with other systems outside (and/or inside) the vehicle 100.

For example, the three vehicles 100a-100c are connected vehicles hosting connected radar sensor devices 400a-400c and the vehicle 100d is a non-connected vehicle hosting a non-connected radar sensor device 400d.

In the following description, the operation of the connected radar sensor device 400a will now be described. The other connected radar sensor devices 400b, 400c of the system operate in an analogous manner.

The radar sensor device 400a can communicate with systems, or sources, outside the vehicle 100a through different types of communications that include, in a non-limitative manner, V2V (Vehicle-to-Vehicle) communications, V2I (Vehicle-to-Infrastructure) communications, V2N (Vehicle-to-Network) communications, and more generally V2X (Vehicle-to-Everything) communications. Thus, the radar sensor device 400a can communicate with other vehicles (for example the vehicles 100b, 100c), radar sensor devices on other vehicles (for example, the radar sensor devices 400b, 400c), components 201, 202 of the road infrastructure 200 (such as lane markings, road signs, traffic lights, road side units 202 or any other communicating element of the road infrastructure 200), and/or a system of a cellular communication network 300 (such as a base station 301 or a network server).

The radar sensor device 400 works under certain operating radar parameters. The radar parameters define characteristics of the radar signal transmitted and received by the radar sensor device 400. In some embodiments, the radar parameters include modulation parameters defining characteristics of a modulation of the radar signal, a duty cycle, and a transmit power level. The duty cycle is defined as a ratio between an observation time, corresponding to the time period within a measurement cycle during which a radar signal is transmitted and an echo radar signal is received, and the total time of the measurement cycle.

Figure 4:
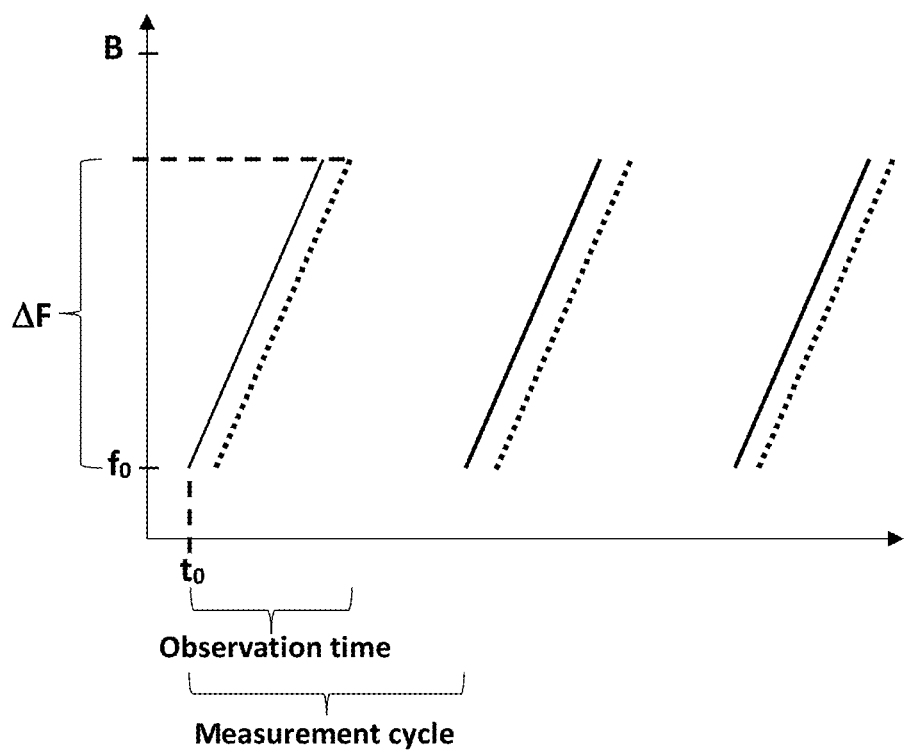
FIG. 4 represents a radar signal transmitted by a radar sensor device and an echoed radar signal received by the radar sensor device, according to an embodiment.

For example, the radar sensor device 400a is a FMCW (Frequency Modulated Continuous Wave) radar. A FMCW radar radiates continuous transmission power and changes its operating frequency during measurement cycles (e.g., the transmission signal is cyclically modulated in frequency). For example, the FMCW radar sensor device 400a changes its operating frequency linearly over time, according to a positive ramp, at each cycle, as shown in FIG. 4. In case of a FMCW radar, the radar parameters can include a frequency offset $f_0$ with respect to a reference frequency (corresponding to the origin of the graph in FIG. 4), a time offset $t_0$ defining a time slot for starting each measurement cycle, a bandwidth $\Delta F$ (for example, a ramp bandwidth) within a radar band B, a duty cycle d, and a transmit power level. As an illustrative and non-limitative example, the radar band B is the frequency range between 76 GHz and 77 GHz. The radar sensor device 400a could be any other type of radar, such as a PMCW (Phase Modulated Continuous Wave) radar, or an OFDM (Orthogonal Frequency-Division Multiplexing) radar or others.

The operation of the radar sensor device 400A, according to an embodiment, will now be described.

In operation, in order to map its environment, the radar sensor device 400a may execute measurement cycles, as shown in FIG. 4, in a continuous loop. As an illustrative and non-limitative example, the duration of each measurement cycle is 60 milliseconds.

Figure 2:
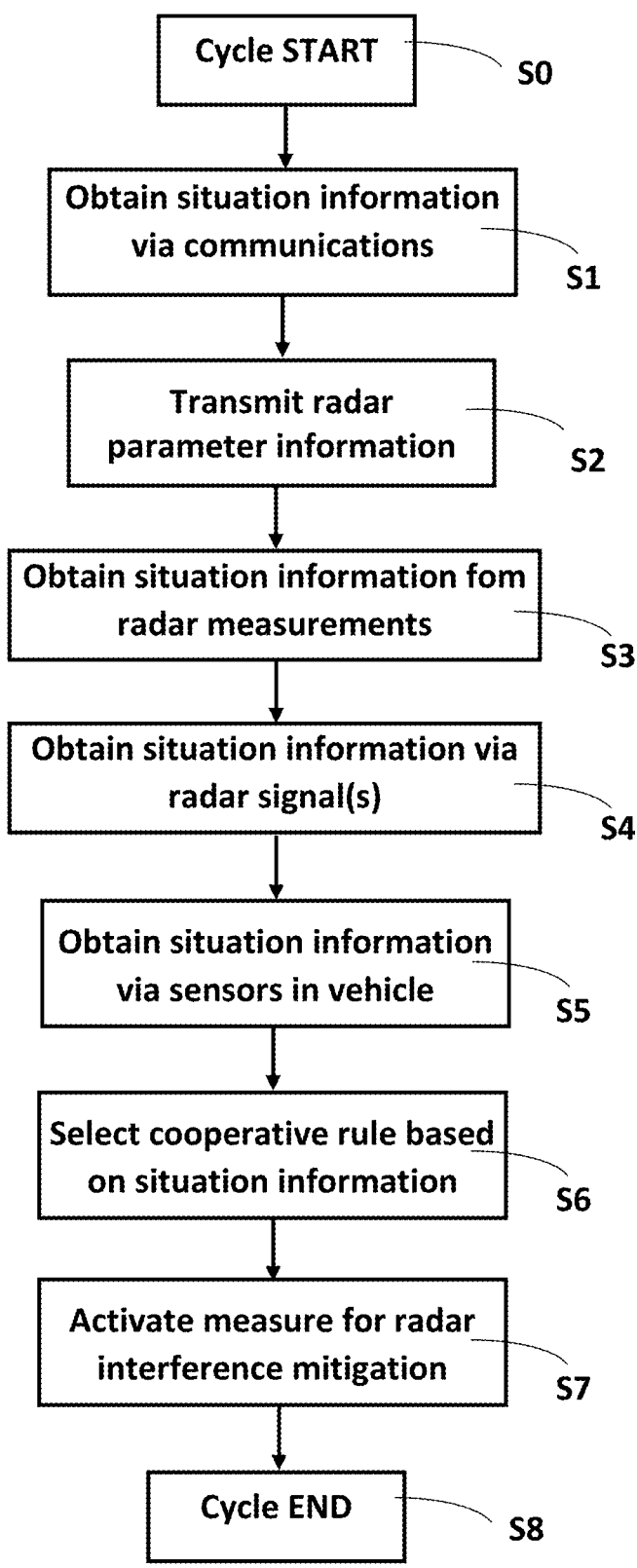
FIG. 2 is a flowchart of a method for radar interference mitigation, carried out by a radar sensor device on a vehicle, according to an embodiment.

The radar sensor device 400a also executes in a continuous loop a process of radar interference mitigation, as shown in FIG. 2. The process includes the following steps S0 to S8. The steps S0 to S8 can be executed during a measurement cycle of the radar sensor device 400a. They may be repeated periodically, for example at each measurement cycle.

In a step S0, a new cycle starts.

In a first step S1, the radar sensor device 400a determines information about a driving scenario in a surrounding environment of the vehicle 100a, based on information received from multiple sources.

A driving scenario describes the temporal development between several scenes in a sequence of scenes and spans a certain amount of time. Each scene corresponds to a snapshot of the environment including the scenery and dynamic elements, as well as all actors' and observers' self-representations, and the relationships among those entities. These terms «scene» and «scenario are defined in the Reference: S. Ulbrich, T. Menzel, A. Reschka, F. Schuldt and M. Maurer. «Defining and Substantiating the Terms Scene, Situation and Scenario for Automated Driving». In: 2015 IEEE International Conference on Intelligent Transportation Systems (ITSC). Angenommen. 2015, which is hereby incorporated by reference. The terms «scene» and «scenario» are defined in Section II and Section IV, respectively.

The driving scenario information includes information on the circumstances and things, or events, that are currently happening and in the environment of the vehicle 100a.

In order to obtain the driving scenario information, the radar sensor device 400a communicates with other systems, or sources, outside the vehicle 100a such as other vehicle(s), and/or other radar sensor device(s), and/or road infrastructure component(s), and/or cellular network device(s), in order to acquire information about the driving scenario that it has to deal with. For example, as shown in FIG. 1, the radar sensor device 400a communicates with the radar sensor devices 400b, 400c and/or the vehicles 100b, 100c, the road infrastructure element 201, the road side unit 202, and a base station 301 of the cellular network 300.

In an embodiment, the radar sensor device 400a, and/or a communication interface of the vehicle 100a, may receive Decentralized Environmental Notification Messages, DENMs, including information related to detected events, from one or more sources acting as ITS-Ss (Intelligent Transport System-Stations). The Decentralized Environmental Notification Messages are defined in the standard document ETSI EN 302 637-3 v1.2.2 (2014-11), which is hereby incorporated by reference. The exchange of DENMs is operated among ITS-Ss by DENM protocol. Upon detection of an event, an originating ITS-S transmits a DENM in order to disseminate the information about this event to other ITS-Ss located inside an area of relevance. The detected events may include different types of events such as traffic condition, accident, roadworks, weather conditions, surface condition, obstacle on the road, animal on the road, human presence on the road, wrong way driving, rescue or recovery work in progress, slow vehicle, dangerous end of queue, vehicle breakdown, post-crash, stationary vehicle, emergency vehicle approaching, dangerous curve, collision risk, signal violation, dangerous situation, etc.

The driving scenario information obtained by the radar sensor device 400a through communications with other systems, or sources, outside the vehicle 100a can include different types of data or information, for example:

information about one or more radar sensor devices on other vehicles in the traffic environment of the vehicle 100a, for example on the radar sensor devices 400b, 400c in FIG. 1, information on vehicles in the environment of the vehicle 100a (for example, the number of vehicles, position, speed, acceleration and/or orientation of the vehicles)

information on the road traffic (e.g., traffic jam or fluid traffic);

information about road signs and road signaling devices, such as a velocity traffic sign and traffic lights;

information on platooning (in other words: on a group of vehicles driving closely and following a leading vehicle by wirelessly receiving acceleration and steering information, thus forming electronically a coupled "road train");

information on a national radio quiet zone providing protection of radio astronomy services.

The above examples are non-limitative and any other item of information about the driving scenario could be obtained via communications with other systems, or sources.

The information on a radar sensor device can include a radar parameter information that indicates the present radar operating parameters used by said radar sensor device.

The information on a radar sensor device on another vehicle can be received through a vehicle-to-vehicle communication. For example, the radar sensor device 400a receives information on the radar sensor device 400b and information on the radar sensor device 400c, through a first V2V communication between the vehicle 100a and the vehicle 100b and a second V2V communication between the vehicle 100a and the vehicle 100c.

The information about the other radar sensor device obtained by the radar sensor device 400a can also include, in a non-limitative manner:
- a position and/or moving information indicating position, speed, acceleration, orientation of the other radar sensor device and/or the vehicle hosting it;
- an information indicating that a radar interference between the radar sensor device 400a and the other radar sensor device has been detected or that no radar interference has been detected;
- an information indicating that the other radar sensor device is either a cooperative radar sensor device (e.g., a radar sensor device operating according to cooperative rules, described later) or an uncooperative radar sensor device.

It may also occur that the radar sensor device 400a does not obtain any information on another radar sensor device detected in its environment. In that case, the radar sensor device 400a determines that no cooperation is possible between the two radar sensor devices for radar interference mitigation.

In the step S1, the radar sensor device 400a can also receive data from a road infrastructure element via a vehicle-to-infrastructure communication and/or data from a server through the cellular network 300 via a vehicle-to-network communication (for example, traffic data from a road traffic monitoring server). For example, the radar sensor device 400a can receive an information about a speed limit on the road from a velocity traffic sign, through a vehicle-to-infrastructure communication, and/or a traffic information from a server providing a traffic and navigation service to drivers through a vehicle-to-network communication.

In an embodiment, the radar sensor device 400a receives information on one or more radar sensor devices on other vehicles by receiving a list $L_i$ of radar sensor devices on vehicles located in an area A in which the vehicle 100a is located. The list $L_i$ can be broadcasted by a broadcasting center 302 in the area A, for example through the mobile communication network 300 an/or via roadside units 202 (or any other road infrastructure transmitter) in the area A. The broadcasting center 302 is in charge of collecting the radar parameters of radar sensor devices 400 on vehicles 100 located in the area A, keeping them up to date, and periodically broadcasting the list $L_i$ to radar sensor devices in the area A. It stores the list $L_i$ of radar sensor devices 400 in the area, valid during a time period i, and periodically updates the list by receiving information from the radar sensor devices in the area A. The list $L_i$ includes identifiers of radar sensor devices 400 of vehicles 100 located in the area during the time period i and collected by the broadcasting center 302 from radar sensor devices 400 in the area A. In addition, for each radar sensor device 400, the list $L_i$ can include a navigation information containing a position information and a moving information, and a radar parameter information including the current radar operating parameters of said radar sensor device.

In an embodiment, in a step S2, the radar sensor device 400a transmits a radar parameter information indicating its own operating radar parameters to the other connected radar sensor devices 400a, 400b, for example through V2V communications. The step S2 can be executed after and during the step S1.

In an optional step S3, the radar sensor device 400a can also derive information about the driving scenario in the surrounding environment of the vehicle 100a from radar measurements performed by the first radar sensor device 400a.

In step S4 (optional), the radar sensor device 400a can also obtain a radar parameter information of another radar sensor device, for example 400d, without communication capability, by receiving a radar signal from the other radar sensor device 400d and analyzing the received radar signal to derive the radar parameter information. This allows the radar sensor device 400a to obtain the radar parameter information of a nearby radar sensor device, such as 400d, that has no communication capability.

Optionally, the process further includes a step S5 of receiving, at the radar sensor device 400a, information from one or more other sensors in the vehicle 100a like cameras, lidars, tachometers, or any other vehicular sensor, in order to obtain information about the driving scenario in the surrounding environment of the vehicle 100a.

The determined information about the driving scenario in the surrounding environment of the vehicle 100a may be stored by the radar sensor device 400a. The information about the driving scenario may be stored in form of a map, a graph, a list of items, or any other type of representation of the driving scenario.

In a step S6, the radar sensor device 400a determines how to change at least one radar parameter to avoid a possible radar interference based on the driving scenario.

In an embodiment, the radar sensor device 400a may select one or more cooperative rules from a database 406 of cooperative rules for radar interference mitigation, depending on the information about the driving scenario in the surrounding environment of the vehicle 100a obtained in the steps S1, S3, S4, and/or S5.

The database of cooperative rules 406 contains a set of cooperative rules for radar interference mitigation. The cooperative rules are predefined rules shared by a plurality or community of radar sensor devices 400 and applied by all of them. They allow the plurality of radar sensor devices to set radar parameters for radar interference mitigation in a cooperative manner. The cooperative rules define how to set radar operating parameters in a radar sensor device to mitigate radar interference(s) according to a present situation of said radar sensor device. Each cooperative rule can be defined as a couple of a driving scenario and a measure for radar interference mitigation to be taken in the driving situation:

Rule={driving scenario,measure}.

A given driving scenario can be coupled with different measures, in different cooperative rules.

The database of cooperative rules can be stored locally in a memory 406 of the radar sensor device 400a, and/or in the on-board network of vehicle 100a. Alternatively or additionally, the cooperative rules can be stored remotely, for example in a cloud infrastructure or in a database on a server, and accessed by the radar sensor device 400a through an external network 300.

Illustrative and non-limitative of cooperative rules are given below in connection in connection with different situations and/or driving scenarios:
Driving scenario 1: no cooperation is possible between the radar sensor device 400a and the other radar sensor device.
In the driving scenario 1, the radar sensor device 400a uses the information collected on the radar signal from the other radar sensor device to correct a radar interference by signal processing and does not change its radar parameters.

Driving scenario 2: the vehicle 100a is in a traffic jam and the radar sensor device 400a is being interfered by another radar sensor device.

In the driving scenario 2, a cooperative rule of reducing the transmit power level, and/or the bandwidth $\Delta F$, and/or the observation time in a measurement cycle can be applied by the radar sensor device 400a.

Driving scenario 3: a velocity traffic sign indicating a speed limit is detected.

In the driving scenario 3, a cooperative rule of reducing the bandwidth $\Delta F$, and/or the observation time in a measurement cycle can be applied by the radar sensor device 400a.

Driving scenario 4: the radar sensor device 400a finds an uncooperative radar sensor device in its environment and identifies its radar modulation parameters.

In the driving scenario 4, the radar sensor device 400a can apply one of the following cooperative rules:
1) setting the sign of the frequency ramp slope opposite to the sign from the interference signal;
2) setting a polarization orthogonal to the polarization from the interference signal;
3) changing the start frequency (in other words, the time offset $f_0$) in order to avoid interference;
4) synchronizing signal to the interference, based on estimating a duty cycle of the interferer, so as to transmit a radar signal in available time slots.

Driving scenario 5: the radar sensor device 400a finds an uncooperative radar sensor device in its environment and does not identify its radar modulation parameters.

In the driving scenario 5, the radar sensor device 400a can apply one of the following cooperative rules:
1) setting randomly the frequency ramp slope sign and/or the start frequency (in other words, the time offset $f_0$) of the radar sensor device 400a;
2) detecting the interference signal and not transmitting any radar signal while the interferer radar sensor device is transmitting.

Driving scenario 6: the traffic is fluid and a radar interference with a radar sensor device on another vehicle driving in an opposite direction (opposite to the driving direction of the vehicle 100a) is detected.

In the driving scenario 6, the radar sensor device 400a uses a interference mitigation strategy based on the vehicle direction, for example the polarization or the frequency ramp slope sign is chosen depending on the direction of the vehicle 100a.

Driving scenario 7: the vehicle 100a has entered a national radio quiet zone for protection of radio astronomy services.

In the driving scenario 7, a cooperative rule of reducing the transmit power level, and/or the bandwidth $\Delta F$, and/or the observation time in a measurement cycle can be applied by the radar sensor device 400a.

Driving scenario 8: the vehicle 100a has joined a platoon (a group of vehicles driving together). In the driving scenario 8, a cooperative rule of reducing the transmit power level, and/or the bandwidth $\Delta F$, and/or the observation time in a measurement cycle can be applied by the radar sensor device 400a.

The radar sensor device 400a determines an information about a driving scenario in the surrounding environment of the vehicle 100a in the step S1, and/or possibly in the step S4, and then, in the step S6, it may select a cooperative rule giving a measure for radar interference mitigation to be taken by the radar sensor device 400a, depending on the determined information about the driving scenario. When different cooperative rules are possible in the present driving scenario of the radar sensor device 400a, the radar sensor device 400a selects one of them, for example randomly.

In a step S7, the radar sensor device 400a changes at least one radar parameter according to the determination made in the step S6. In an embodiment, the cooperative rule selected by the radar sensor device 400a may be applied in the step S7. It means that the measure for radar interference mitigation given by the cooperative rule is activated in the radar sensor device 400a. Typically, in the step S7, a new radar operating parameter is activated in the radar sensor device 400a, according to the selected rule.

In a step S8, the cycle is ended.

The cycle including the steps S0 to S8 can be executed at each measurement cycle of the radar sensor device 400a, or periodically every N measurement cycles with N>2.

Alternatively, the steps S1 to S7 may be performed continuously, in real time.

Figure 3:
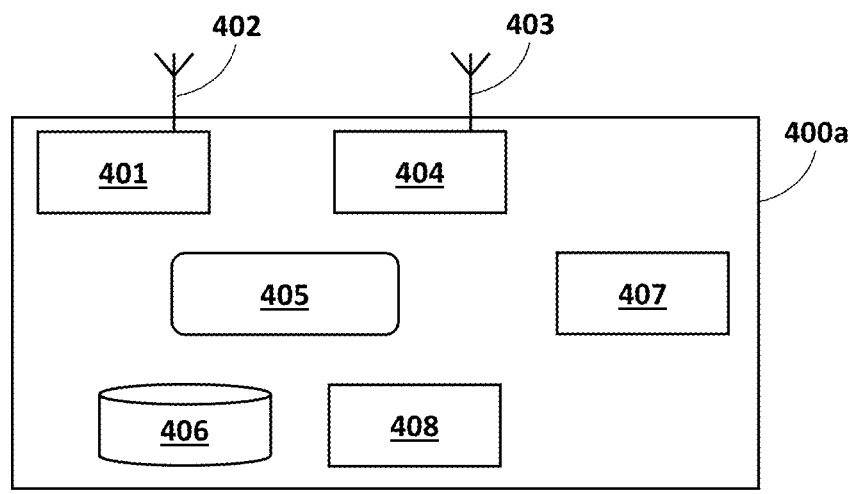
FIG. 3 is a functional block diagram of a radar sensor device, according to an embodiment.

FIG. 3 shows schematically a functional block diagram of a radar sensor device 400a with communication capability, according to an embodiment.

The radar sensor device 400a has a transmitter 401 producing electromagnetic waves (in other words: an electromagnetic signal) in the radio or microwaves domain, a transmitting antenna 402, a receiving antenna 403, a receiver 404 and a processor 405 to determine properties of the object(s) based on the transmitted radar signals and received radar signals.

Moreover, in an embodiment, the radar sensor device 400a may have a memory 406 storing the set of cooperative rules for radar interference mitigation, a communication interface 407 to communicate with an outside system and a component 408 for radar interference mitigation.

In an embodiment, the communication interface 407 is an internal communication interface to interface with an on-board network in the vehicle 100 (in case that the radar sensor device 400a communicates with outside systems via a wireless communication channel of the vehicle 100 that is a connected vehicle). In another embodiment, the communication interface 406 allows to communicate directly with another system outside the vehicle 100 via a wireless communication channel.

In an embodiment, the component 408 is a software component (in other words: a computer program) having instructions to cause the radar sensor device 400a to execute the steps of the method for radar interference mitigation previously defined (i.e., the steps S0 to S8 carried out by the radar sensor device 400a). The software component 408 runs on the processor 405 of the radar sensor device 400a. The software component (or computer program) 408 can be stored in a storage module such as volatile memory (e.g., ROM, RAM, etc.) and/or non-volatile memory (e.g., Flash, NAND, etc.), that is permanently or removably integrated in the radar sensor device, and can be executed by a processor, a computer, or a calculator.

The present disclosure also concerns:
- a computer-readable medium having stored thereon the computer program or software component 408;
- a vehicle 100a including at least one radar sensor device such as the radar sensor device 400a;
- a system including a plurality of vehicles as above defined.

What is claimed is:

1. A method comprising:
    determining, by a first radar sensor device on a vehicle and based on information received from multiple sources, information about a driving scenario in a surrounding environment of the vehicle, wherein receiving information from multiple sources includes:
    receiving road infrastructure information from at least one component of a road infrastructure through a vehicle-to-infrastructure communication, wherein the at least one component of the road infrastructure is one of a lane marking, a road sign, and a traffic light;
    receiving a first radar signal from a second radar sensor device on at least one second vehicle through a vehicle-to-vehicle communication;
    receiving a second radar signal from a third radar sensor device on at least one third vehicle without communication capability;
    determining radar parameter information of the second radar sensor device by analyzing the received first radar signal; and
    determining radar parameter information of the third radar sensor device by analyzing the second radar signal received from the third radar sensor device, wherein
    based on the determined radar parameter information about the driving scenario, determining how to change at least one radar parameter of the first radar sensor device to avoid a possible radar interference; and
    changing the at least one radar parameter according to the determination.

2. The method of claim 1, wherein the multiple sources of information are of different types.

3. The method of claim 1, wherein receiving information from multiple sources includes receiving information from at least one device of a communication network through a vehicle-to-network communication.

4. The method of claim 1, wherein receiving information from multiple sources includes receiving a list of radar sensor devices on vehicles located in an area from a broadcasting center.

5. The method of claim 1, wherein receiving information from multiple sources includes receiving one or more Decentralized Environmental Notification Messages, DENMs, including information related to one or more detected events.

6. The method of claim 1, wherein:
    determining how to change at least one radar parameter of the first radar sensor device to avoid a possible radar interference includes selecting a rule from a set of predefined cooperative rules for radar interference mitigation shared by a plurality of radar sensor devices depending on the information about the surrounding environment; and
    changing the at least one radar parameter according to the determination includes activating a new radar operating parameter according to the selected rule in the first radar sensor device.

7. The method of claim 1, wherein changing at least one radar parameter includes changing at least one of: a modulation bandwidth, a frequency offset, a time offset, a transmit power level, a duty cycle, a polarization, or a modulation type.

8. An apparatus comprising:
    a first radar sensor device including:
        a transmitter part to transmit radar wave signals; and
        a receiver part to receive radar wave signals;
    at least one processor; and
    a computer-readable storage medium storing instructions that, when executed by the at least one processor, cause the at least one processor to:
        determine, by the first radar sensor device on a vehicle and based on information received from multiple sources, information about a driving scenario in a surrounding environment of the vehicle, wherein the information received from multiple sources includes:
        information received from at least one component of a road infrastructure through a vehicle-to-infrastructure communication, wherein the at least one component of the road infrastructure includes one of a lane marking, a road sign, and a traffic light;
        information received from a first radar signal from a second radar sensor device on at least one second vehicle through a vehicle-to-vehicle communication;
        information received from a second radar signal from a third radar sensor device on at least one third vehicle without communication capability;
        determining radar parameter information of the second radar sensor device determined by analyzing the first radar signal received from the second sensor radar device; and
        determining radar parameter information of the third radar sensor device by analyzing the second radar signal received from the third radar sensor device, wherein
        based on the determined radar parameter information about the driving scenario, determine how to change at least one radar parameter of the first radar sensor device to avoid a possible radar interference; and
        change the at least one radar parameter according to the determination.

9. The apparatus of claim 8, wherein receiving information from multiple sources includes receiving one or more Decentralized Environmental Notification Messages, DENMs, including information related to one or more detected events.

10. The apparatus of claim 8, wherein receiving information from multiple sources includes receiving information from at least one device of a communication network through a vehicle-to-network communication.

11. The apparatus of claim 8, wherein:
    determining how to change at least one radar parameter of the first radar sensor device to avoid a possible radar interference includes selecting a rule from a set of predefined cooperative rules for radar interference mitigation shared by a plurality of radar sensor devices depending on the information about the surrounding environment; and
    changing the at least one radar parameter according to the determination includes activating a new radar operating parameter according to the selected rule in the first radar sensor device.

12. The apparatus of claim 8, wherein changing at least one radar parameter includes changing at least one of: a modulation bandwidth, a frequency offset, a time offset, a transmit power level, a duty cycle, a polarization, or a modulation type.

13. A non-transitory computer-readable storage medium storing instructions that, when executed by at least one processor, cause the at least one processor to:
    determine, by a first radar sensor device on a vehicle and based on information received from multiple sources, information about a driving scenario in a surrounding environment of the vehicle, wherein the information received from multiple sources includes:

information received from at least one component of a road infrastructure through a vehicle-to-infrastructure communication, wherein the at least one component of the road infrastructure includes at least one of a lane marking, a road sign, and a traffic light;

information received from a first radar signal from a second radar sensor device on at least one second vehicle through a vehicle-to-vehicle communication;

information received from a second radar signal from a third radar sensor device on at least one third vehicle without communication capability;

determine radar parameter information of the second radar sensor device by analyzing the first radar signal received from the second radar sensor device; and determine radar parameter information of the third radar sensor device by analyzing the second radar signal received from the first radar sensor device; wherein based on the determined radar parameter information about the driving scenario, determine how to change at least one radar parameter of the first radar sensor device to avoid a possible radar interference; and change the at least one radar parameter according to the determination.

14. The non-transitory computer-readable storage medium of claim 13, wherein receiving information from multiple sources includes receiving one or more Decentralized Environmental Notification Messages, DENMs, including information related to one or more detected events.

15. The non-transitory computer-readable storage medium of claim 13, wherein changing at least one radar parameter includes changing at least one of: a modulation bandwidth, a frequency offset, a time offset, a transmit power level, a duty cycle, a polarization, or a modulation type.

* * * * *